United States Patent
Griffin et al.

(10) Patent No.: US 8,169,093 B2
(45) Date of Patent: May 1, 2012

(54) METHOD AND APPARATUS FOR EXTRACTING ENERGY FROM WIND AND WAVE MOTION

(75) Inventors: Philip J Griffin, Perth (AU); Brian Kinloch Kirke, Adelaide (AU); Peter Donald Parker, Gold Coast (AU)

(73) Assignee: Seadov Pty Ltd, Gold Coast, Queensland (AU)

( * ) Notice: Subject to any disclaimer, the term of this patent is extended or adjusted under 35 U.S.C. 154(b) by 357 days.

(21) Appl. No.: 12/377,510

(22) PCT Filed: Aug. 14, 2007

(86) PCT No.: PCT/AU2007/001153
§ 371 (c)(1),
(2), (4) Date: Feb. 17, 2009

(87) PCT Pub. No.: WO2008/019436
PCT Pub. Date: Feb. 12, 2008

(65) Prior Publication Data
US 2010/0229545 A1    Sep. 16, 2010

(51) Int. Cl.
*F03B 13/10* (2006.01)
(52) U.S. Cl. ............... 290/42; 290/55; 290/53
(58) Field of Classification Search .......... 290/42–44, 290/53–55; 60/495–501; 417/330–333; 415/7, 2.1, 4.1, 4.2, 85, 641.7
See application file for complete search history.

(56) References Cited

U.S. PATENT DOCUMENTS

| 3,882,320 A | 5/1975 | Schmeller |
| 4,159,427 A * | 6/1979 | Wiedemann .................... 290/55 |
| 4,993,348 A * | 2/1991 | Wald .............................. 114/265 |
| 5,512,787 A * | 4/1996 | Dederick ...................... 290/4 R |
| 6,100,600 A | 8/2000 | Pflanz |
| 7,352,787 B2 * | 4/2008 | Mukoyama et al. ....... 372/43.01 |

FOREIGN PATENT DOCUMENTS

| DE | 3825241 | 10/1989 |
| EP | 1734255 | 12/2006 |
| GB | 2165008 | 4/1986 |
| JP | 57-171080 | 10/1982 |
| JP | 8-261131 | 10/1996 |
| JP | 2001-221142 | 8/2001 |
| WO | WO 96/00848 | 1/1996 |

* cited by examiner

*Primary Examiner* — Tho D Ta
(74) *Attorney, Agent, or Firm* — Fay Sharpe LLP

(57) ABSTRACT

A method and apparatus for extracting energy from wind and wave motion using a common floating platform comprising a ship hull (10) which is moored in an offshore location and which supports wind turbines (27) for extracting energy from wind and wave energy extraction devices (12) positioned at least at one side of the hull (10) for extracting energy from wave motion relative to the hull (10). The method and apparatus may also use water current energy extraction devices. The hull (10) may also support a desalination plant (45) which uses the energy generated from the wind, wave and water current energy extraction devices.

21 Claims, 10 Drawing Sheets

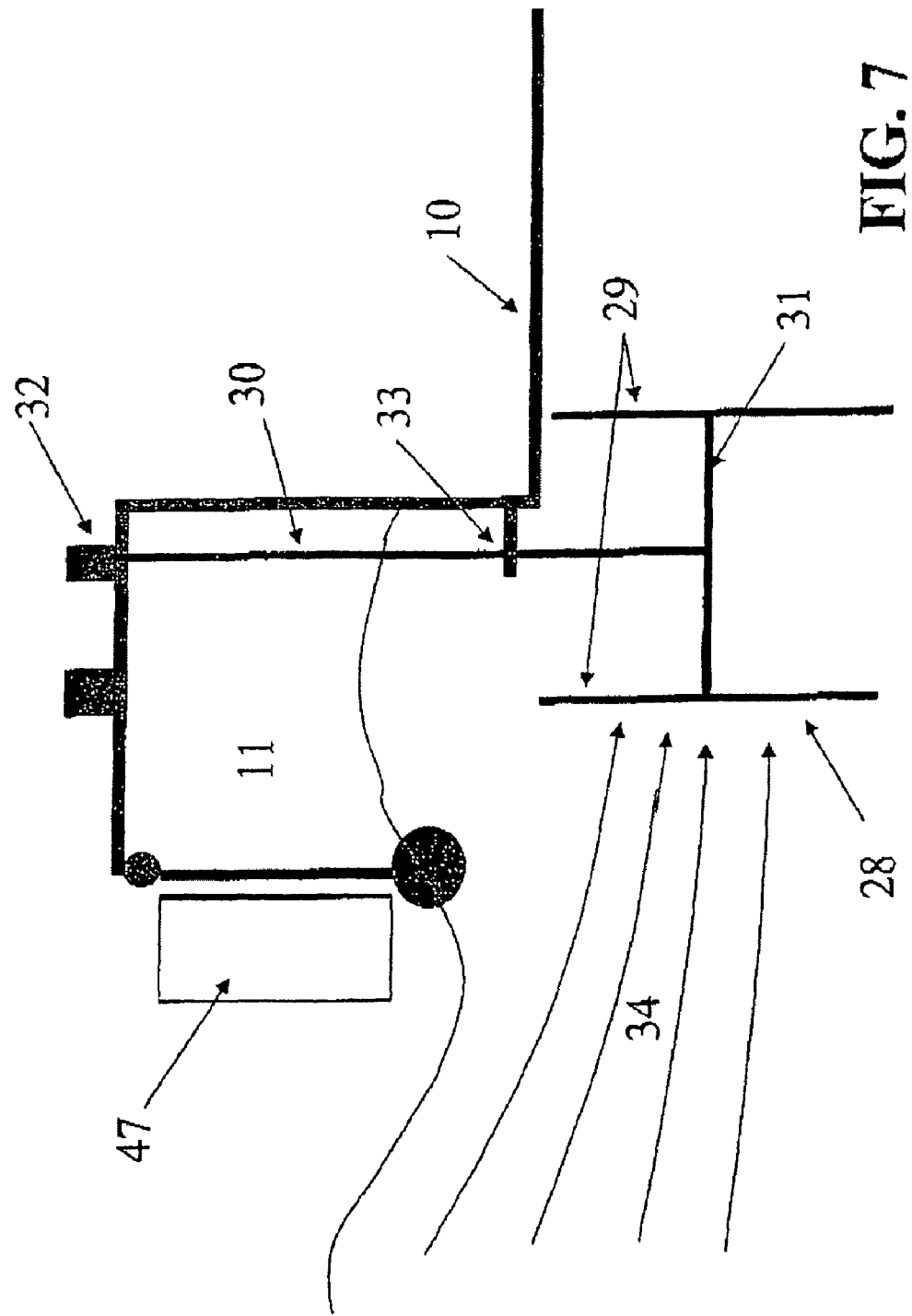

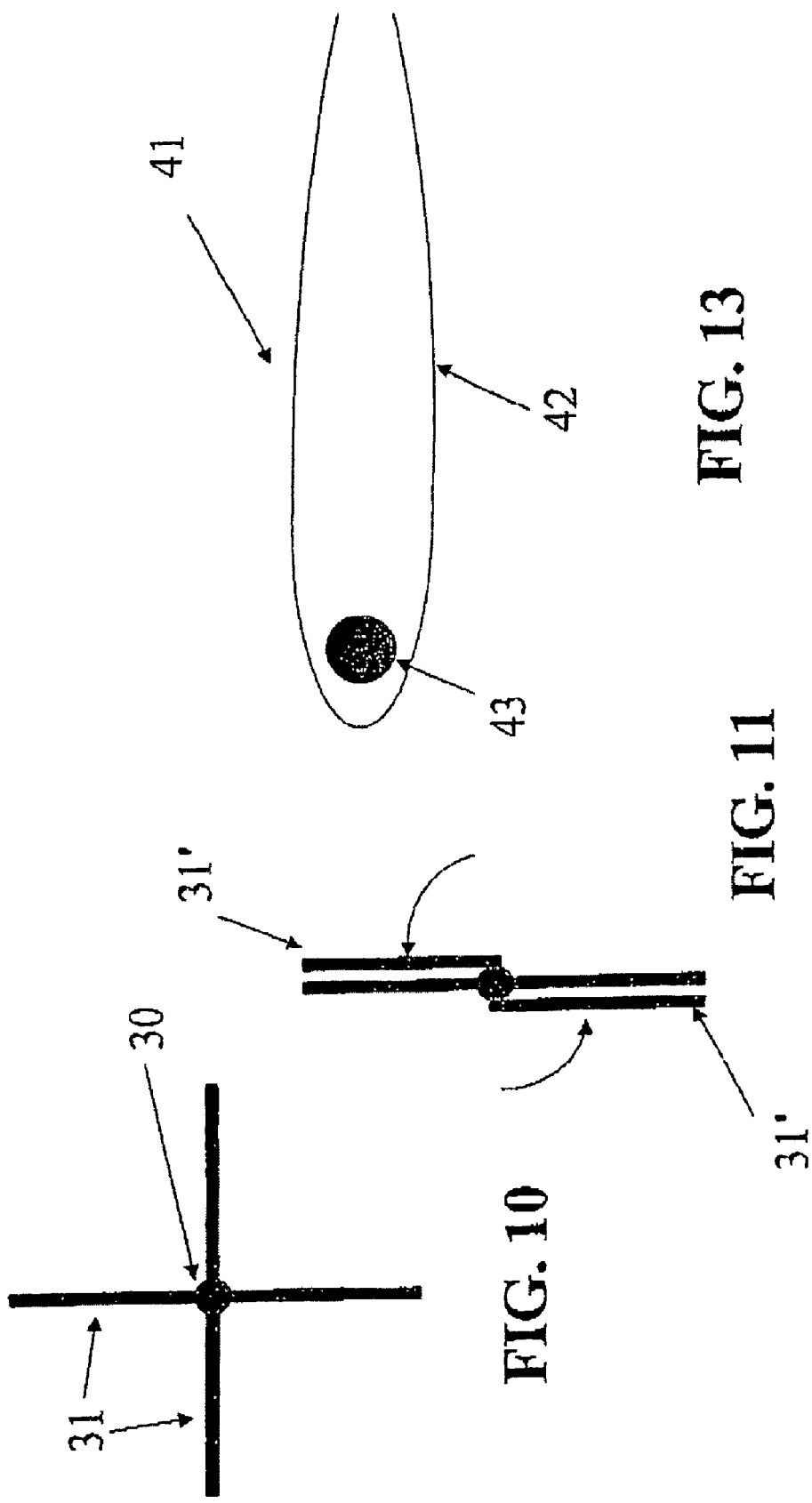

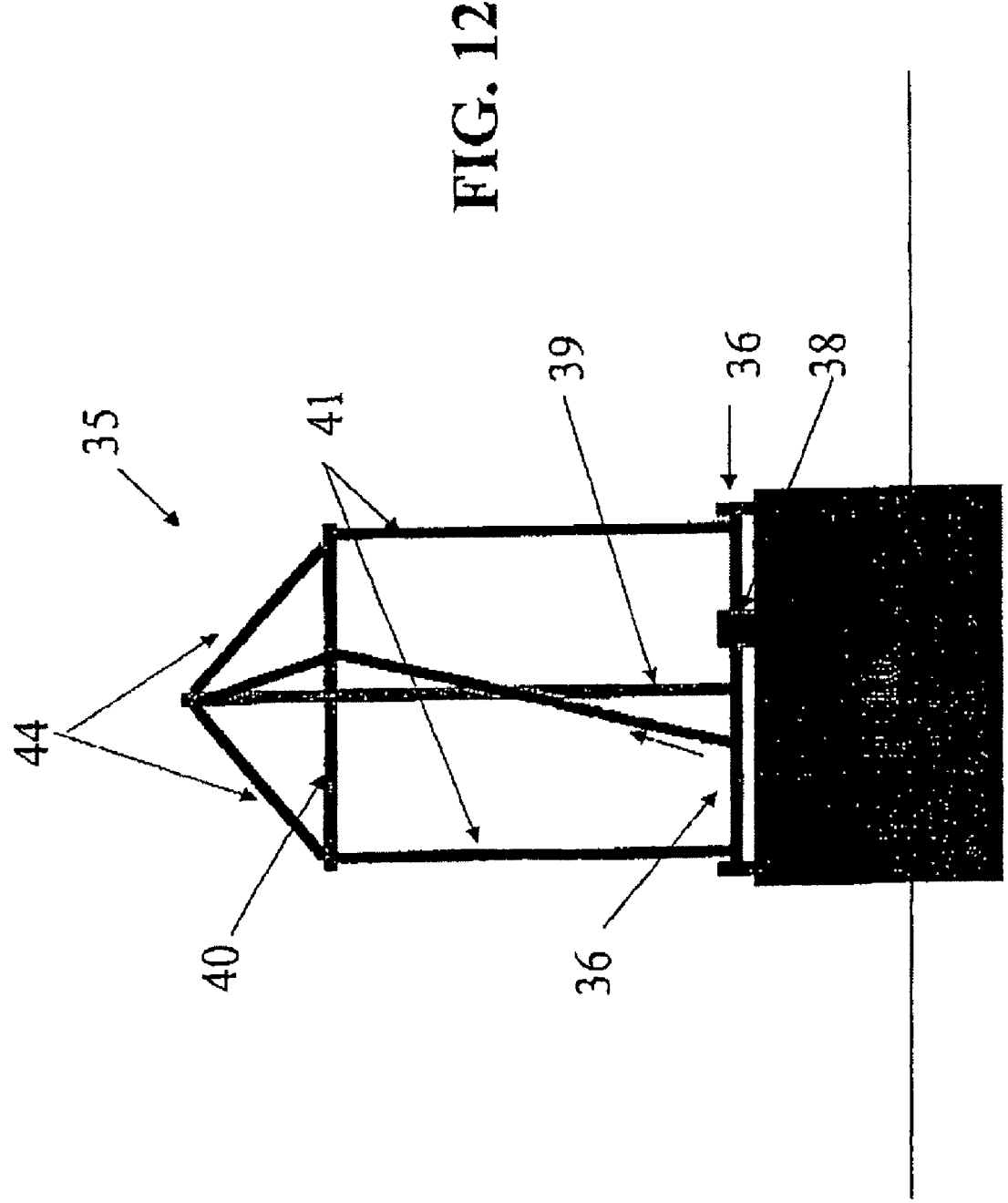

METHOD AND APPARATUS FOR EXTRACTING ENERGY FROM WIND AND WAVE MOTION

CROSS-REFERENCE TO RELATED APPLICATIONS

This application claims priority to PCT/AU2007/001153, filed Aug. 14, 2007 which claims priority to AU 2006904365, filed Aug. 14, 2006.

TECHNICAL FIELD

This invention relates to an integrated, synergistic combination of devices for extracting energy from naturally occurring phenomena including waves, wind and marine currents, including tidal flows, to generate electrical energy. The present invention in a particular aspect aims to provide a beneficial interaction between one or more wave energy conversion devices, one or more wind turbines and/or one or more marine current turbines mounted on a ship hull.

BACKGROUND ART

Oscillating water columns (OWCs) are well-known devices for extracting energy from waves, and comprise a chamber having a bottom which is open and underwater and with an opening at the top, above water, the chamber housing or communicating with one or two air turbines with or without non-return valves, arranged in such a way that a turbine is turned so as to produce power regardless of whether air is flowing into or out of the chamber consequent upon wave motion. A preferred method is to use one bi-directional turbine (i.e. one that turns in the same direction regardless of the direction of air flow). As a wave crest approaches, the water surges up inside the chamber, reducing the air volume above the water surface and increasing the pressure. Air therefore flows outwards through the turbine, generating power. As the wave subsides the air space increases, the pressure drops and air is drawn back into the chamber through the turbine, again generating power. This process is repeated with each wave.

OWC devices have been constructed on exposed rocky coastlines, however these onshore devices may be opposed by the public on the grounds of visual pollution. Also, wave energy is attenuated in shallow water and an OWC in deep water (>50 m) is able to harvest more energy.

Floating prototype OWC devices have been tested with the aim of harvesting energy from the more energetic wave climate in deeper water. One of these devices, the Kaimei, was based on a small ship hull. The efficiency of conversion of wave energy in this device however was found to be low because the floating body was too small and light for the prevailing wave period and tended to move up and down with the swell, cancelling out most of the relative movement between the body and the surrounding water. Another device, the Osprey, was not based on a ship hull and was not able to weather a storm when it was being towed into position. A third device, the Swedish Floating Wave Power Vessel, is a large, expensive purpose-built structure which only captures energy from a small length of wave front, so that the capital cost per unit of rated output is high.

A further problem with known OWC devices is that the fixed vertical wall of the chamber facing the oncoming swells shuts out much of the available energy because the water moves in an orbital motion, with the water at the wave crest advancing in the direction of motion of the wave. As a result, the highest known water to air energy conversion efficiency for an OWC is just under 70%.

Present day wind turbines are a mature technology, and the 3 blade, horizontal axis type has become the industry standard. These wind turbines have the gearbox and generator assembly housed in a nacelle at the top of the tower, and in large, multi-megawatt machines this assembly typically weighs hundreds of tonnes. Blades may be 40 m or more in length. As the size of wind turbines increases, it is becoming increasingly difficult to transport such large components to remote hilly onshore sites and lift them into position on top of towers, which may be 60 to 100 m high. This transport difficulty, and the fact that the best onshore sites on some countries are either already taken, or are not available for environmental or social reasons, has driven a move to develop offshore wind farms. While wind energy offshore is typically 30-50% higher than at onshore sites, foundations, installation and maintenance are more expensive. Wind turbines fixed to the sea floor are limited to depths of about 15 m, and can only be installed in relatively calm weather, which is not common at sites selected for their consistent high winds. The massive gearboxes needed for these machines are reaching the limits of manufacturing and installation capacity, and a large proportion of wind turbine failures are related to gearboxes. There is now speculation in the wind energy industry that there may be a need for a radically different form of wind turbine, especially for larger offshore installations, which does not suffer from the problem of very large, heavy gearboxes which must be mounted and serviced high off the ground.

Marine current turbines of both axial flow and cross flow patterns are being developed by a large number of companies around the world. These require expensive mounting structures to withstand the large hydrodynamic forces which act on them, and the cost of fabrication and installation of these support structures is a major problem, reducing cost-effectiveness.

SUMMARY OF THE INVENTION

The present invention aims to overcome or alleviate one or more of the above disadvantages by providing an energy extraction method and apparatus which allow for an increase in energy extraction from naturally occurring phenomena by a synergistic interaction between a floating platform and the energy extraction devices mounted on it. The present invention in a further aspect aims to provide apparatus which reduces shook loading on energy extraction devices of the apparatus which thereby increases service life and cost effectiveness.

The present invention thus provides in one aspect apparatus for extracting energy from wind and wave motion, said apparatus comprising
  a common floating platform comprising a ship hull;
  means for mooring said ship hull in an offshore location;
  one or more wind turbines supported on said hull for extracting energy from wind; and
  one or more wave energy extraction devices positioned at least at one side of said hull for extracting energy from wave motion relative to said hull
  whereby rolling of said hull consequent upon fluctuating wind loading on said wind turbines increases relative movement between said wave energy extraction devices and the water adjacent said hull to increase energy extraction therefrom.

The hull suitably includes one or more ballast or storage tanks and means are provided for adjusting the mass and distribution of ballast water in the tanks to increase natural periods of heave, roll and pitch of the hull to cause resonance of the hull and maximise relative motion between the hull and water to maximise energy capture by the wave energy extraction devices. The storage tanks may be built into the hull and can carry seawater or desalinated water. Preferably means are provided to sense the motion of the hull and adjust the volume and distribution of water in the tanks in response to the sensed output of the wave energy extraction devices by pumping water to or draining water from the tanks.

In a particularly preferred form, the floating body comprises a large oil tanker hull supporting one or more OWC devices preferably built into part of the hull. Some of the oil tanker's existing wing tanks may form ready-made OWC chambers. The hull suitably comprises a large massive body with natural periods of roll, heave and pitch near to the dominant period of the swells such that it will tend to resonate, greatly increasing the relative movement between the water and the body. This provides a particularly preferred arrangement for an OWC device since volume changes in the air above the water in the chamber can be maximised.

Any relative vertical motion between the hull and the water surface can be used to generate power through an OWC device and the present invention will be able to convert wave energy through the heave, roll and pitch motions of the hull. As energy is extracted from the system, the relative motion is damped, thus limiting heave, pitch and roll motion.

Suitably the or each OWC device comprises an air chamber which preferably extends upwardly from the bottom of the hull. The air chamber or chambers may be provided along one or both sides of the hull. As the hull moves relative to the motion of the waves, air within the chamber or chambers is compressed or expanded and energy extraction means within the chamber or chambers can be used to extract the energy from the compressing or expanding air caused by an oscillating water column within the chamber. The energy extraction means suitably comprises a bi-directional air turbine.

A movable panel, wall or door may be provided on one side of the air chamber of the OWC device to assist in increasing the pressure fluctuations inside the air chamber. The movable wall, panel or door suitably defines the outer side of the air chamber and may comprise part of the side of the hull. Preferably the panel or door is hingedly mounted to an upper part of the chamber for movement about a generally horizontal axis. Preferably float means are provided at or near the lower edge of the wall, panel or door to causes the wall, panel or door to swing inwards with the motion of the water at the wave crest thereby using that component of the wave energy to further reduce the volume and increase the pressure inside the chamber, thereby increasing the energy capture. As the wave recedes and the water level drops, the water in the trough moves back towards the oncoming waves and drives the door back, thereby increasing the volume and decreasing the pressure in the air chamber. Preferably means are provided to lock the panel or doors in a fixed position to facilitate deployment and or relocation of the hull.

In a further aspect, adjustable guide means may be provided on the side/s of the hull to direct waves towards the OWC devices. The guiding means may comprise a plurality of flaps which can extend laterally from the hull. The flaps may be mounted for hinged movement about a substantially vertical axis so as to be pivotally adjustable. Thus when the hull is other than beam-on to the wave motion, the flaps may be adjusted to direct incoming waves towards the OWC chambers to increase efficiency of energy collection. When the hull is beam-on to the wave motion, the flaps typically extend at right angles to the hull. The flaps however may be pivoted to lie adjacent to and be juxtaposed with respective doors or panels of the OWC device.

Preferably the plurality of flaps are linked together to be adjustable simultaneously. Means may be provided to adjust the flaps in accordance with the output from the OWC devices so that the most efficient position of the flaps can be determined.

The apparatus may also include one or more water current energy extraction devices suitably turbines for extracting energy from water current movement relative to the hull, the one or more water current turbines being mounted to the hull. The turbines are adapted in an operative position to extend beneath the hull for extracting energy from water flowing past the hull due to current or tidal action. Preferably the or each turbine comprises a cross flow turbine, most suitably a Darrieus type cross flow turbine which can extract energy from flow in any direction relative to the turbine axis. Preferably the or each turbine may be extended from and retracted into the hull. The or each turbine preferably extends substantially vertically from the hull. A Darrieus or cross flow turbine where used may have two or more blades mounted to a shaft which is normally substantially vertically oriented. The shaft may be telescopic to enable the turbine to be retracted into or extended from the hull. In the case of a Darrieus type turbine with four blades positioned radially outwardly from the shaft and extending substantially parallel to the shaft, means may be provided to swing two opposite blades so as to lie adjacent to the other two opposite fixed blades and in a substantially vertical plane for easy retraction into the hull. Alternatively, a Darrieus turbine with straight blades may be provided with a means to fold the radial arms supporting the blades so that they, and the blades, lie adjacent and parallel to the shaft.

In a particularly preferred form, the turbines may be mounted within respective chambers of the OWC devices and may be extendable therefrom or retractable into the chambers. Besides any ocean and tidal currents at the site, further cyclical relative motion between the turbines and the surrounding water will be generated by the hull's rolling motion in response to waves and wind gusts acting on the wind turbines. The water turbines will be able to harvest energy from this rolling motion and in so doing, they will help to stabilise the hull.

The wind turbines on the hull are preferably arranged at spaced locations longitudinally of the hull of the vessel. The turbines however may be offset from each other laterally of the hull. Preferably the wind turbines comprise vertical axis wind turbines such as Darrieus type wind turbines which can extract energy from relative air movement in any direction, enabling them to harness power from the rolling motion of the ship, thereby helping to stabilise it. Most preferably the turbines carry three or four blades so as to be self-starting.

The blades of the Darrieus wind turbines may be attached at their lower ends directly to the periphery of a large ring gear at deck level of the hull driving one or more generators spaced around its periphery. Preferably the ring gear supports a central tower and the blades may be held out from the tower near its upper end by radial arms, and tensioned so that the blades act as stays, thereby eliminating bending moments on the tower. Each blade may comprise a light, torsionally flexible hollow extrusion of aerofoil cross section, with a high tensile cable running through it near its leading edge connected to the radial arms and ring gear respectively which takes the tension while allowing the trailing edge of the blade to twist downwind. The blades below the radial arms may also be inclined to the vertical while remaining in a tangential plane.

Preferably the mooring means enable the adjustment of the hull orientation so as to maximise wind and wave energy capture in low energy conditions and to readjust it for surviving storms. To maximise incident energy and hence energy capture in relatively calm conditions the hull should be oriented parallel to the wave crests and/or normal to the wind direction, which often but not always coincides with the direction of travel of swells. For this purpose, the mooring means may comprise one or more fixed mooring lines connected to an anchor point such as a mooring buoy and to one end or stern of the hull and one or more mooring lines of variable length connected to the fixed mooring line and to the other end or bow of the hull. The forward variable line can be adjusted to position the hull beam on to the wave motion or wound in so as to position the hull with bow to windward when wind and/or wave conditions become too violent for beam-on orientation.

The forward mooring line or lines may be controlled by one or more winches on the hull which may be controlled by wind and motion sensors and/or sensors which sense the tension in the lines and which can wind in or let out the variable length line. Electric motor/generators or hydraulic pump/motors may be attached to the winch or winches to harness energy when the bow is swinging downwind back to the beam on position, this energy being used in turn to supply the necessary power to wind the ship back into the bow to windward position when heavy conditions return.

Electrical energy generated using the energy extraction methods and apparatus described above are preferably used to desalinate seawater using a reverse osmosis plant. The desalination plant is suitably housed in the ship hull on which the energy conversion devices are mounted. Storage tanks for desalinated water may also be provided within the hull.

In another aspect, the present invention provides a method for extracting energy from wind and wave motion, said method comprising the steps of:

providing a common floating platform comprising a ship hull;

mooring said ship hull in an offshore location;

providing one or more wind turbines on said hull for extracting energy from wind; and providing one or more wave energy extraction devices positioned at least at one side of said hull for extracting energy from wave motion relative to said hull such that rolling of said hull consequent upon wind loading on said wind turbines increases relative movement between said wave energy extraction devices and the water adjacent said hull to increase energy extraction therefrom.

The method may also include the step of providing one or more water current energy extraction devices for extracting energy from water current movement relative to the hull. The method may further comprise the step of increasing rolling motion of the hull by varying ballast in the hull to increase energy extraction by the wave energy device and/or water current extraction devices.

The method may further comprise the step of adjustably mooring the hull to vary the orientation of the hull relative to the direction of wave motion and/or the wind.

By using more than one renewable energy source as described above fluctuations in energy supply are reduced. Thus when there is little or no wind there may still be large swells originating from storms many hundreds or thousands of kilometers away, and tidal currents operate on cycles independent of wind or waves.

By locating a seawater desalination plant on the same platform as the energy conversion devices which drive it, power transmission losses are substantially reduced or eliminated and the there is no need for a feedwater pipeline and a reject brine pipeline from a shore-based desalination plant. The clean, low turbidity water requiring minimum pre-treatment and the best energy resources are all located several kilometers offshore and where the apparatus according to the present invention will be deployed.

As fluid flows around a body immersed in fluid must flow faster to get around the obstruction, ocean currents will flow faster around a ship hull, and water turbines placed close under a hull will be able to harvest more energy than turbines placed remote from the hull.

Wave and/or wind and/or marine current energy conversion devices mounted on a single large floating platform can be designed to interact in such a way that some of the energy embodied in the dynamic response of the platform to the forces acting on it from one device can be harvested by another device. Thus for example a gust of wind will increase the load on the wind turbines, causing the platform to roll. This rolling response will cushion the effect of the gust on the wind turbines, thereby reducing shock loading and fatigue problems in the structure, and at the same time will cause water turbines mounted under the platform to move through the water, generating additional power while damping the heeling motion. Rolling will also cause the water level in the OWCs to rise or fall, enabling them to extract more energy and at the same time to damp the rolling motion. As the gust passes and the platform rights itself, the water turbines and OWCs will extract more energy. Because of the cubic relationship between flow velocity and power density, more energy is available from a cross flow current turbine oscillating in a steady flow than from the same turbine held stationary in a steady flow.

Swells will cause the platform to roll, pitch and heave. By suitable selection of the mass, the moments of inertia and restoring force and moments, the natural periods of these motions can be made to correspond to the dominant swell period, thereby amplifying the response of the hull to the swells and maximising the energy extraction by the OWCs. At the same time, rolling and pitching will cause the wind turbines to move through the air, enabling them, if they are cross flow turbines, to capture energy in addition to that available from the ambient wind, while at the same time damping the response of the platform. Cross flow wind turbines are similar to cross flow water current turbines in that more energy is available when they are oscillating in a steady wind than when stationary in the same steady wind.

The integrated method and apparatus described above comprising the combination of a seaworthy platform and multiple energy conversion devices constitutes an improved method and apparatus for extracting energy from naturally occurring phenomena including waves, wind and marine currents such as tidal flows, and in particular for using this energy to desalinate seawater on the same platform.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 7 illustrates the preferred arrangement for supporting tidal or other current flow turbines on the hull;

FIGS. 10 and 11 illustrate schematically a further arrangement for adjusting the turbine between an operative and folded position;

FIG. 12 illustrates an improved vertical axis wind turbine;

FIG. 13 illustrates in cross section a blade of the turbine of FIG. 12; and

DETAILED DESCRIPTION OF THE PREFERRED EMBODIMENT

Figure 1:
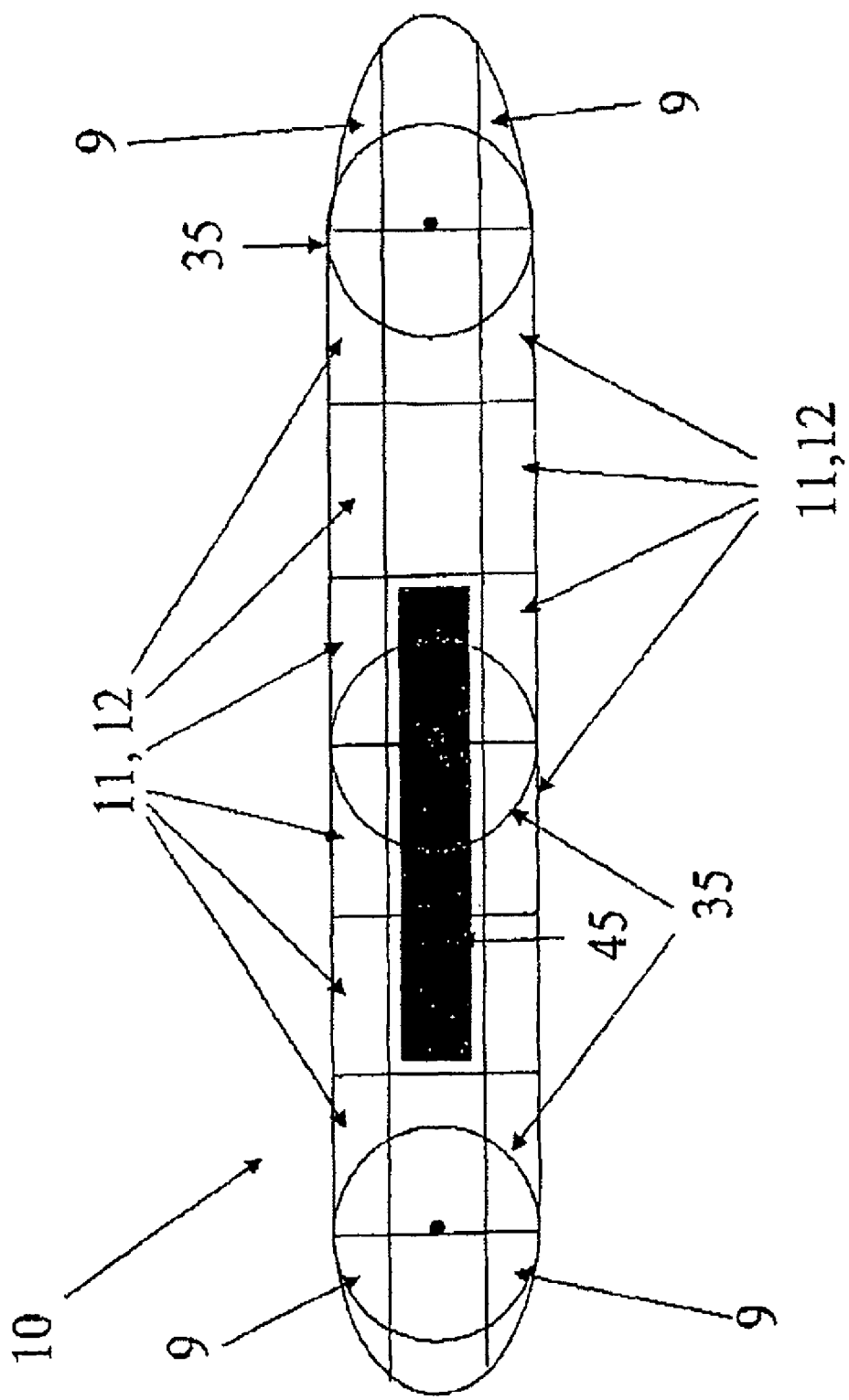
FIG. 1 is a schematic plan view of a hull of a vessel provided with energy extraction devices according to the present invention.

FIG. 1 illustrates a typical hull 10 of a vessel such as a large oil tanker hull which houses or carries the energy extraction means according to the invention. Arranged along one or both sides of the hull 10 are a plurality of air chambers 11 of oscillating water column (OWC) wave energy conversion devices 12, the chambers 11 being open at their lower ends through the hull and housing or supporting at their upper end bi-directional air turbines 13 (see FIG. 2) which communicate with the interiors of the chambers 11. The hull 10, because of its large mass and moment of inertia about both longitudinal and transverse axes, stays in a substantially fixed position relative to short period wave motion, but preferably heaves, rolls and pitches out of phase with the wave motion and thus maximises upward and downward movement of the water in waves relative to the chamber 11 which will compress the air within the chamber 11 and thereafter allow for expansion of air within the chamber 11 respectively. The bi-directional turbine 13 will extract the energy from the compressing and expanding air which is forced in opposite directions through the turbine 13 as indicated by the double ended arrow A in FIG. 2.

The hull 10 is also provided with forward and aft wing tanks 9 at the bow and stern of the hull 10 and positioned on opposite sides of the hull 10. To increase the energy extraction from wave energy, water may be pumped into or out of the forward and aft wing tanks 9, thereby adjusting the natural periods of heave, roll and pitch of the hull to match the prevailing dominant wave period.

To further increase the energy extraction from wave energy, the outer side of one or more of the chambers 11 is defined by a swinging door or panel 14 which is hinged to the side of the hull 10 for movement about a substantially horizontal hinge axis 15. A float 16 is fixed to the door 14 at or adjacent to the lower edge of the door 14, the float 16 floating on or adjacent to the surface of the water. In the position shown in FIG. 2, the float 16 positions the door 14 in a substantially vertical attitude.

Figure 3:
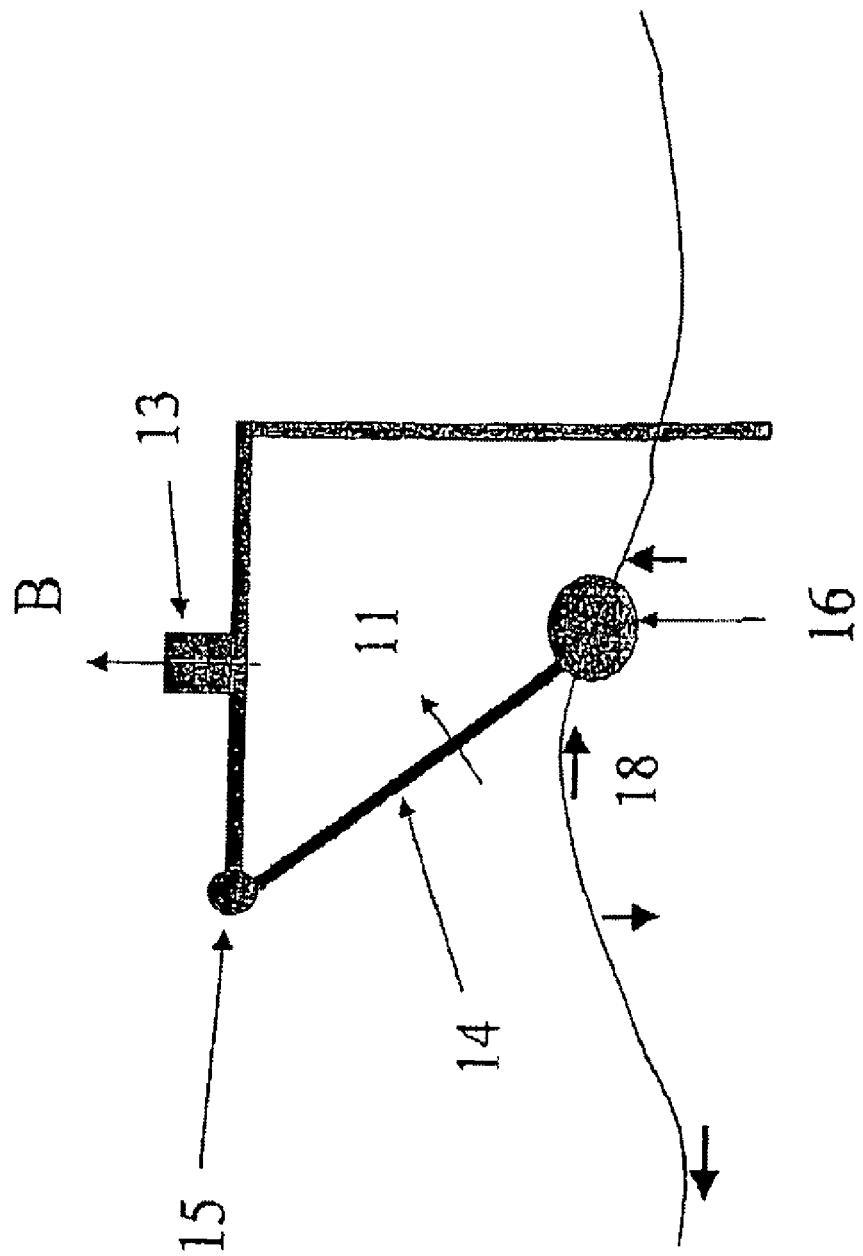
FIGS. 3 and 4 illustrate the operation of the wave energy conversion device of FIG. 2.

As a wave crest 17 approaches from the side as shown in FIG. 3, the door 14 will be caused to swing inwardly about the axis 15 with the forward motion 18 of the water at the wave crest causing the float 16 to move inwardly. This horizontal component of the wave energy thus further reduces the volume of the chamber 11 and thereby increase the pressure inside the chamber 11 and thus increasing the airflow in the direction B through the turbine 13 to increase energy extraction by the turbine 13.

Figure 4:
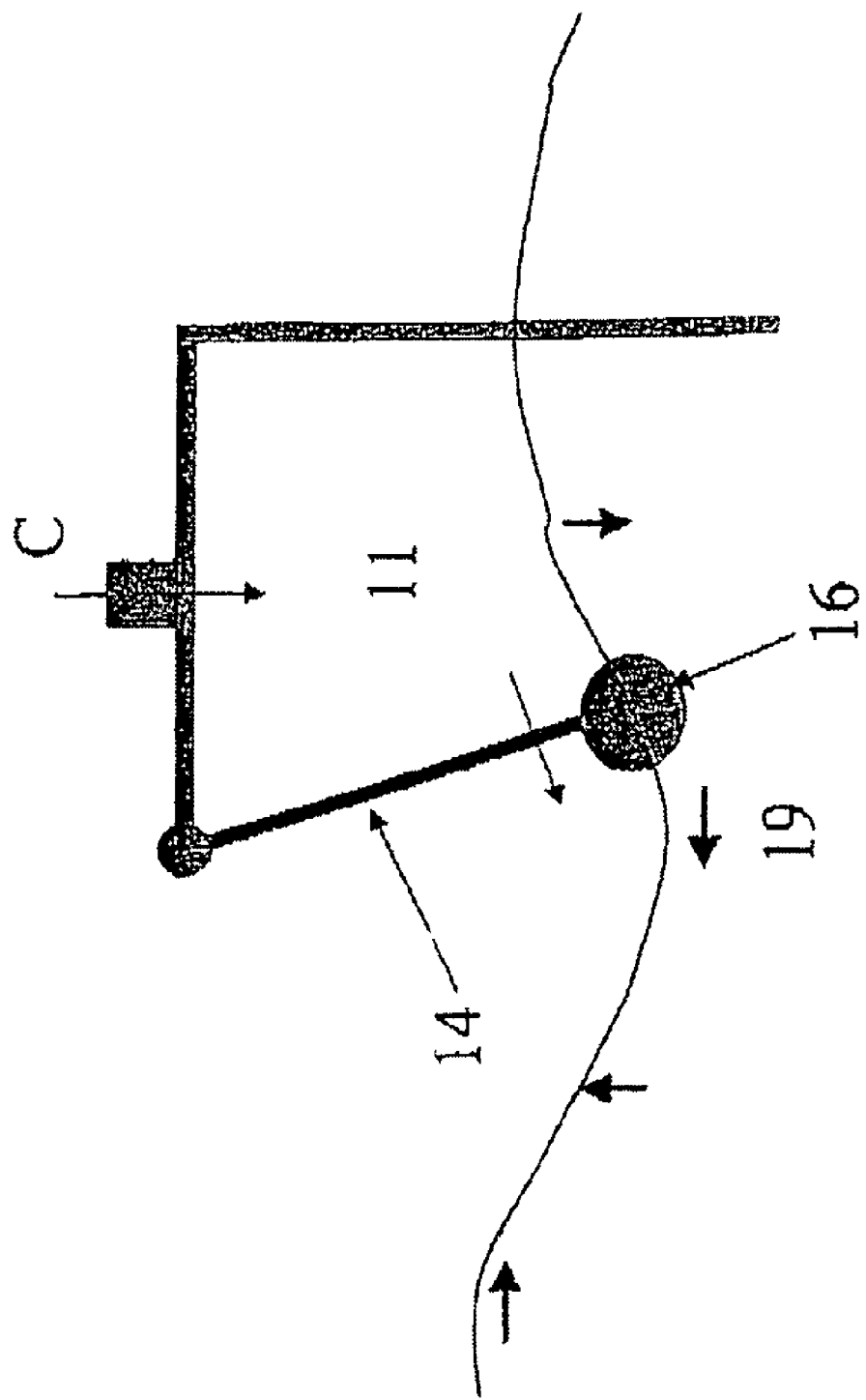

As the wave crest 17 passes into the chamber 11 and the water level drops as shown in FIG. 4, the water in the trough 19 moves back towards the oncoming waves and pivotally drives the door 14 back towards the vertical position as the float 16 follows the level of water. This thereby increases the volume of the chamber 11 and decreases the pressure of air in the chamber 11 and again increases air flow through the turbine 13 in the opposite direction C which again increases the extraction of energy from the wave motion by the turbine 13.

Figures 5, 6:
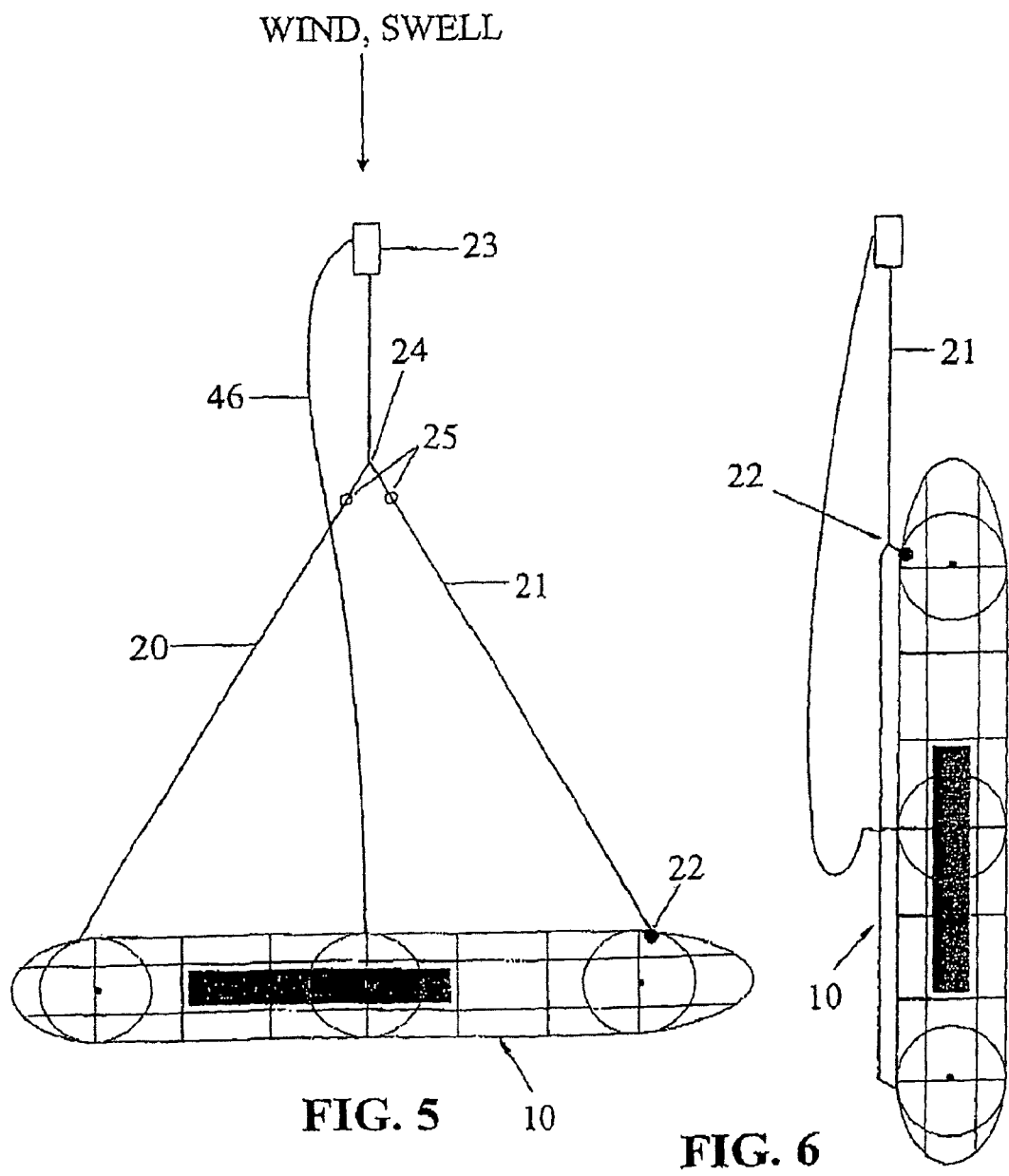
FIGS. 5 and 6 illustrate the manner in which the mooring of the hull is adjusted in accordance with the wind and swell or wave direction and wind loading on the hull.

Maximum energy collection by the OWC devices 12 is achieved if the hull 10 of the vessel is maintained beam on to the wave motion as shown in FIG. 5. For this purpose, a fixed length bridle or mooring line 20 is coupled to the stern of the hull 10 and a variable length bridle or mooring line 21 is coupled to the bow of the hull 10 through a windlass or winch 22. The fixed length mooring line 20 is connected to a mooring buoy 23 anchored to the seabed whilst the variable length bridle 21 is anchored to the bridle 20 at connection point 24. In the preferred position for energy collection shown in FIG. 5, the lengths of the bridles 20 and 21 up to the connection point 24 are substantially the same such that the hull 10 and bridles 20 and 21 form an equilateral triangle.

Figure 2:
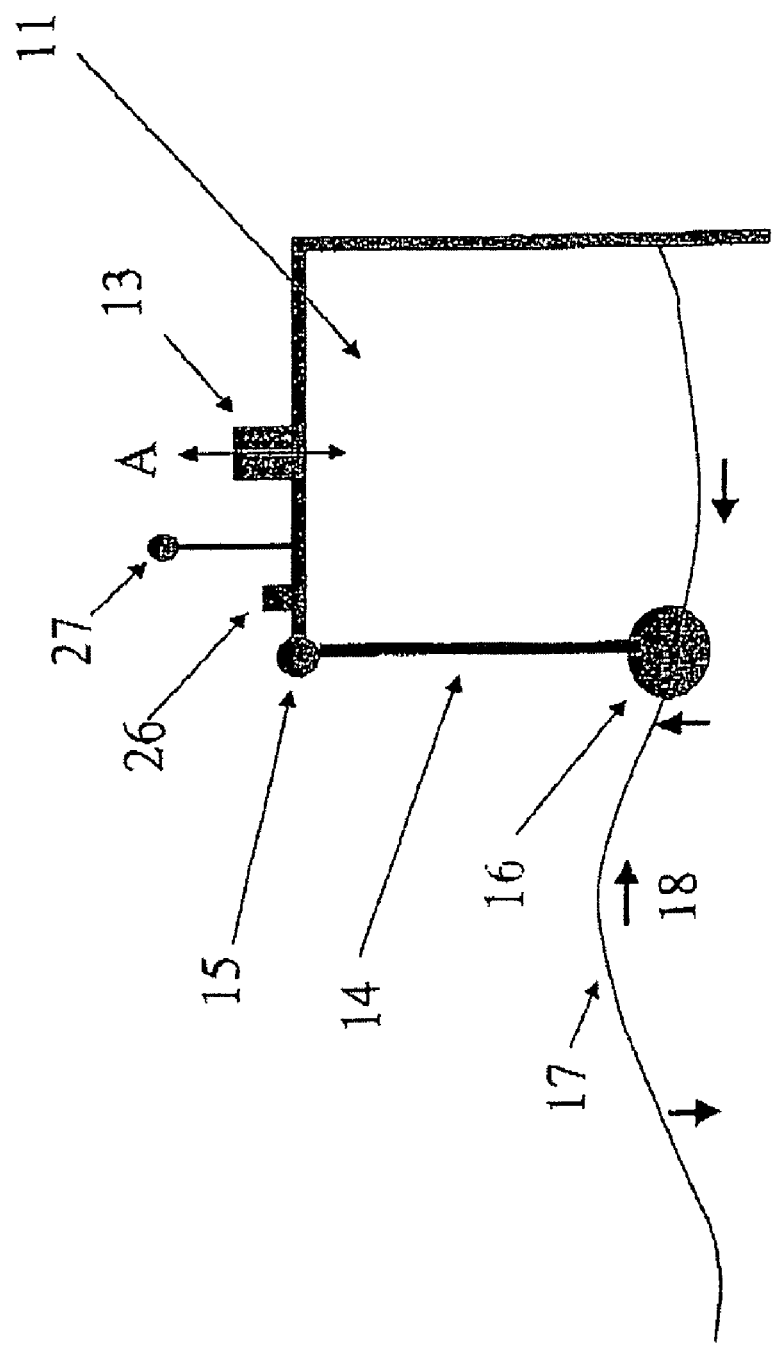
FIG. 2 illustrates schematically a wave energy conversion device as used in the hull.

In the event of heavy weather conditions, the winch 22 is operated to wind in the bridle 21. This will move the bow of the hull 10 to windward and allow the stern of the hull 10 to move to leeward until the hull 10 is substantially aligned with the direction of the prevailing waves or swell and wind as shown in FIG. 6. Operation of the winch 21 may be effected automatically by using signals generated by one of more of the following sensors:

1. Load cells 25 shown in FIG. 5, which sense tension in the bridles 20 and 21
2. Accelerometers or tilt meters 26 on the hull 10 as shown in FIG. 2, which sense when the rolling, heaving or pitching motion of the hull 10 reaches the maximum safe level,
3. An anemometer 27 shown in FIG. 2, which registers when the wind speed reaches a maximum safe limit for beam-on operation.

Signals derived from any of these sensors can be used for sending a control signal to the winch 19 when sensed conditions exceed a predetermined level. When the swell and/or wind reduces, the same sensors send a signal to winch 19 which may be operated in the reverse direction to allow the hull 10 to swing back towards the position of FIG. 5.

Figures 8, 9:
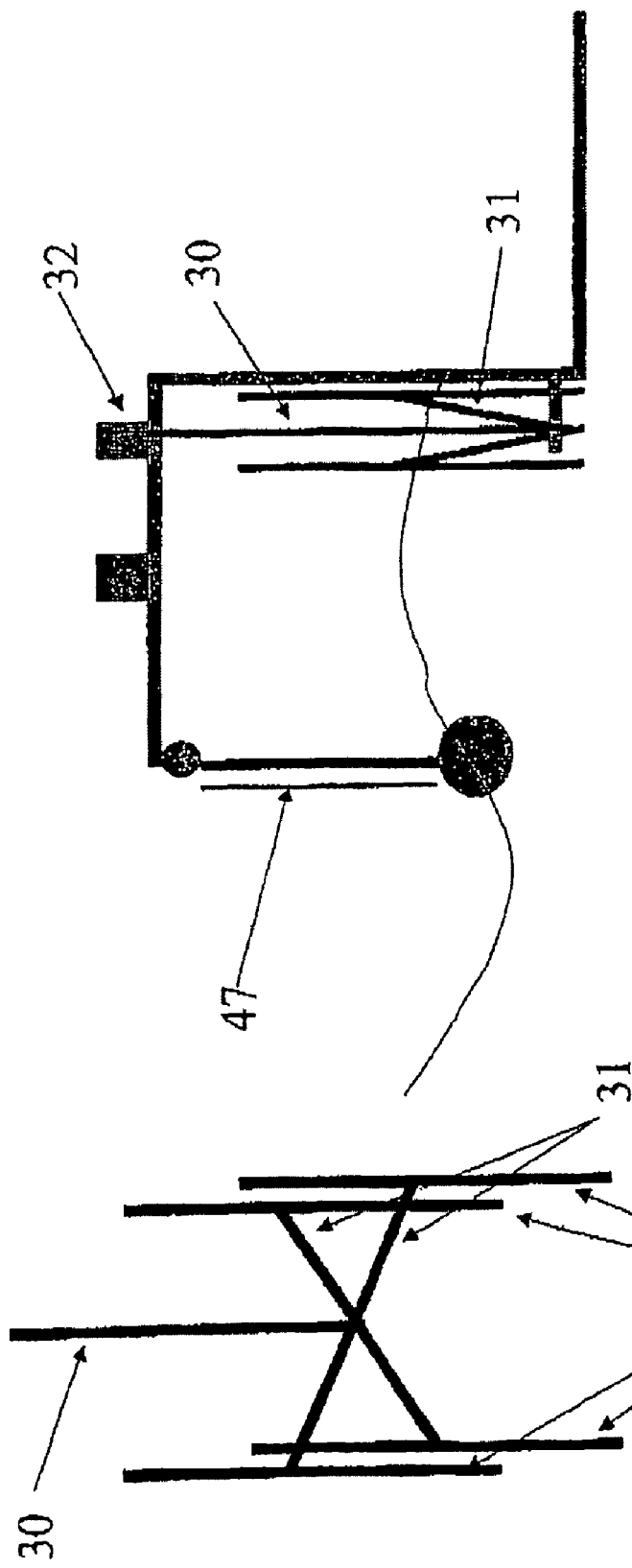
FIG. 8 illustrates in schematic isometric view the turbine of the tidal or current flow turbine of FIG. 7.
FIG. 9 illustrates the manner in which the turbine of FIG. 8 is folded and retracted into the hull.
Figure 14:
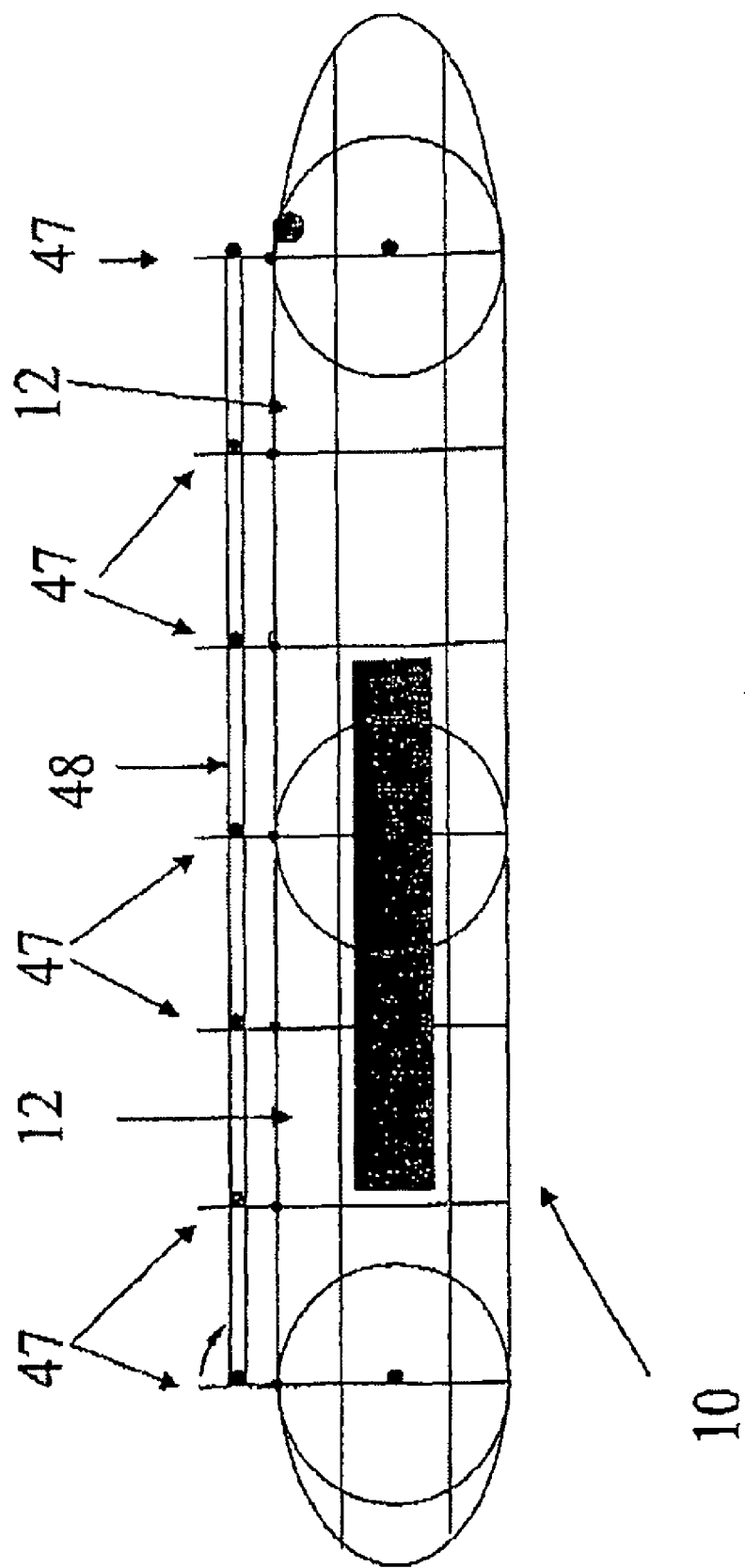
FIG. 14 illustrates schematically a guide flap arrangement for use with the wave energy conversion devices.

For extracting energy from water current such as tidal motion, one or more turbines 28 as shown in FIG. 7, are provided for extracting energy from water flowing past the hull, a turbine 28 in this embodiment being located in a generally vertical attitude and extending in an operating position beneath the hull 10. The turbine 28 comprises a Darrieus type cross flow turbine having two or more straight or curved blades 29 mounted on a shaft 30, via radial arms 31 in the ease of a straight blade turbine. The shaft 30 is coupled to a generator 32 and supported by a bearing 33 intermediate the generator 32 and turbine 28. For towing, the shaft 30 is able to telescope so as to retract the turbine 28 into the chamber 11, by first folding the blades 29 into a plane as shown in FIG. 8 by folding of the arms 31 inwardly and then raising the blades 29 as shown in FIG. 9.

Alternatively and as shown in FIGS. 10 and 11, a pair of the opposing radial arms 31 are hinged to the shaft 30 so as to be hingedly movably between an operating position where they are locked to the shaft 30 in an operating position extending at 90 degrees to an adjacent arm 31 and a folded position in which they are hingedly moved to a position juxtaposed with the adjacent arms 31 so that the arms 31 and blades 29 are substantially coplanar. For operation of the turbine, this procedure may be reversed, first lowering the turbine 28 then folding the blades 29 out into operating position as shown in FIG. 7. The turbine blades 29 are positioned relative to the hull 10 such that maximum energy can be extracted from tidal flow or current where it is accelerated to flow under the hull 10, as shown by the streamlines 34. To prevent the doors 14 of the OWC devices 10 damaging the turbine 28 in the retracted position, selectively operable latching or locking means may be provided to lock the doors 14 against pivotal movement.

The hull 10 additionally carries wind turbines 35 at spaced longitudinal positions along the hull 10 as shown in FIG. 1. The turbines 35 in this embodiment are vertical axis Darrieus turbines 35 of the type as shown in FIG. 12, such that energy can be extracted from the wind irrespective of its direction relative to the hull 10. The turbines 35 however may be alternative forms of wind turbine.

A turbine 35 includes a ring gear 36 mounted to the deck of the hull 10 by bearings 37 around its periphery which hold it in a plane parallel to the deck. One or more generators 38 are also coupled to the ring gear 36 which acts as a step up gearbox and is driven directly thereby. The ring gear 36 supports a central tower 39 and a series of radial arms 40 which are similar to the spreaders used on a yacht mast extend outwardly from near the upper end of the tower 39. A series of lower turbine blades 41 are attached at their lower ends to the periphery of the ring gear 36 at spaced positions and at their upper ends to the respective radial arms 40 to be held out from the tower 39 at a radius similar to the radius at which the blades 41 are attached to the ring gear 36. The blades 41 are tensioned so that the blades 41 themselves act as stays thereby eliminating bending moments on the tower 41 and greatly reducing its cost. The blades 41 in tension will not carry bending moments, so their cost is greatly reduced in comparison to normal wind turbine blades which carry very high bending moments and must therefore be made structurally strong.

Each blade 41 as shown in FIG. 13 comprises a light, torsionally flexible hollow extrusion or skin 42 of aerofoil cross section, with a high tensile cable 43 running through it near its leading edge, which takes the tension being connected between arm 40 and ring gear 36 while allowing the trailing edge of the blade 41 to twist downwind in the manner of a yacht mainsail, thus reducing stall and increasing starting torque.

The blades 41 below the radial arms 40 are also inclined to the vertical as is apparent in FIG. 12 while remaining in a tangential plane so that the tension in the cables 43 supporting the blades 41 transmits all or nearly all of the driving torque directly to the ring gear 36 thus eliminating most of the torque on the tower 39 and further reducing its cost. The blades 41 thus transmit power directly to the generators 38 without the need for a large shaft and multi-stage gearbox to carry the very large torque generated by a large wind turbine.

The turbine 35 additionally includes upper blades 44 which extend between the respective arms 40 and the upper and of the tower 39. The blades 44 may be of similar construction to the blades 41 and provide additional support to the tower 39.

In low wind conditions, where there is only enough wind energy to drive one generator at near rated capacity and optimum efficiency, the other generators may be disconnected by means of a centrifugal clutch or other suitable load disengaging device. The remaining generators may be programmed to start generating one by one as the wind speed and turbine torque and RPM increases.

When a storm comes, or when maintenance is required, both ends of each hollow extrusion making up the outer skin 42 of a blade 41 may be released so that the blade 41 is free to rotate about the high tensile cable 43 running through it near its leading edge, allowing the trailing edge of the blade 41 to rotate downwind until the angle of attack is zero and the blade 41 generates no torque and the wind turbine may be easily stopped.

The energy extraction devices on the hull 10 are most preferably used to supply energy for desalination apparatus 45 supported in the hull 10 as shown in FIG. 1, with potable water extracted from such apparatus being pumped to shore through a floating hose 46 coupled to the mooring buoy 23 (as shown in FIGS. 5 and 6), the hose 46 being connected to an underwater line which extends to the shore. The desalination apparatus 45 is of the reverse osmosis type but may be other forms of desalination apparatus and feedwater for treatment by the apparatus 45 is provided from a "clean" environment adjacent the hull 10.

To enhance the operation of the OWC devices 12, the hull 10 may be provided with a plurality of flaps 47 as shown in FIGS. 7 and 13 which are hingedly mounted to the hull 10 between the respective doors or panels 14 of the respective OWC devices for movement about a substantially vertical axis. The flaps 47 may be linked together by a common operating arm 48 pivotally connected to the flaps 47 such that fore and aft movement of the arm 48 effects simultaneous pivotal movement of the flaps 47 in parallelism. The position of the flaps 47 may be pivotally adjusted by the arm 48 from a position extending outwardly at right angles to the hull as shown in FIGS. 7 and 13 to a position lying adjacent the hull 11 as shown in FIG. 9. When deployed, the flaps 47 direct waves towards the OWC devices and optimize energy collection of energy thereby. Sensing means may be provided to sense the output of the OWC devices 12 and adjust the flaps 47 automatically until the maximum output of the OWC devices 12 is achieved The operating arm 48 can be connected to any form of actuator such as an hydraulic actuator to adjustment of the flaps 47.

The energy extraction devices on the hull 10 may be applied for the generation of energy for any purpose such as for the supply of power for land-based applications.

Whilst particular designs of energy extraction devices have been described for use on the hull 10, it will be appreciated that different forms of energy extraction devices may be used for generating power or extracting energy from wind, wave motion and water currents. Thus the vertical axis turbines use for wind energy and current energy extraction may be of other forms than that illustrated. Furthermore the OWC devices, wind turbines and current turbines described in the embodiments may be used in applications other than those described above.

The terms "comprising" or "comprises" as used throughout the specification are taken to specify the presence of the stated features, integers and components referred to but not preclude the presence or addition of one or more other feature/s, integer/s, components or group thereof. Further reference to prior art herein is not to be taken as an admission that such prior art constitutes common general knowledge.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. Apparatus for extracting energy from wind and wave motion, said apparatus comprising a common floating platform comprising a hull of a ship or vessel, said hull being subject to pitching and/or rolling motion from wind and/or waves;

means for mooring said hull in an offshore location;

one or more vertical axis wind turbines supported on said hull for extracting energy from wind; and one or more wave energy extraction devices positioned at least at one side of said hull for extracting energy from wave motion relative to said hull whereby in use pitching and/or rolling of said hull consequent upon wind gust loading on said wind turbines and/or wave motion increases relative movement between the or each said wind turbine and the surrounding air and between the or each said wave energy extraction device and the water adjacent said hull resulting in an increase in energy extraction from wind and wave motion;

wherein one or more of said wave energy extraction devices comprise one or more oscillating water column (OWC) wave energy conversion devices, each OWC device including means for extracting energy from compression and expansion of air within an upright air chamber caused by an oscillating column of water in the air chamber due to wave motion.

2. Apparatus as claimed in claim 1 wherein said hull includes one or more storage tanks for carrying water and means for adjusting the mass and distribution of the water in said tanks to adjust natural periods of heave, roll and pitch of said hull in relation to a prevailing dominant wave period to which the floating platform is subjected to maximise energy capture by said wave energy extraction device/s.

3. Apparatus as claimed in claim 1 wherein the or each said wind turbine includes a ring gear supported for rotation in a plane substantially parallel to the deck of said hull, a upright support tower extending centrally from said ring gear, blades extending between said ring gear and tower and generator means adapted to be driven by said ring gear.

4. Apparatus as claimed in claim 3 wherein said tower includes outwardly extending radial arms towards an upper end thereof, said blades being connected between respective said radial arms and said ring gear.

5. Apparatus as claimed in claim 3 wherein each said blade comprises a light, torsionally flexible hollow extrusion or skin of aerofoil cross section, with a high tensile cable running through it near its leading edge and connected to respective said radial arms and said ring gear to take the tension in said blade but allowing the trailing edge of said blade to twist downwind.

6. Apparatus as claimed in claim 5 wherein said blades are inclined to the vertical while remaining in a tangential plane so that the tension in the cables supporting the blades transmits driving torque directly to the ring gear.

7. Apparatus as claimed in claim 1 wherein said mooring means include means for adjusting the position of said hull relative to the direction or wave motion and/or the wind.

8. Apparatus as claimed in claim 7 wherein said mooring means including a first fixed mooring line connected to one end of said hull, a second adjustable mooring line connected between said fixed mooring line and the other end of said hull, and means for adjusting the effective length of said second mooring line so as to move said hull between a position in which said hull is beam on to the direction of wave motion and/or wind or is end on to said wave motion and/or wind.

9. A method for extracting energy from wind and wave motion, said method comprising the steps of:

providing a common floating platform comprising a hull of a ship or vessel, said hull being subject to pitching and/or rolling motion from wind and/or waves;

mooring said hull in an offshore location;

providing one or more vertical axis wind turbines on said hull for extracting energy from wind; and providing one or more wave energy extraction devices positioned at least at one side of said hull for extracting energy from wave motion relative to said hull such that pitching and/or rolling of said hull consequent upon wind gust loading on said wind turbines and/or wave motion increases relative movement between the or each said wind turbine and the surrounding air and between the or each said wave energy extraction device and the water adjacent said hull to increase energy extraction from wind and wave motion;

wherein one or more of said wave energy extraction devices comprise one or more oscillating water column (OWC) wave energy conversion devices, each OWC device including means for extracting energy from compression and expansion of air within an upright air chamber caused by an oscillating column of water in the air chamber due to wave motion.

10. A method as claimed in claim 9 and including the step of providing one or more water current energy extraction devices for extracting energy from water current movement relative to said hull.

11. A method as claimed in claim 9 and including the step of increasing rolling motion of said hull by varying mass and distribution of water in one or more storage tanks in said hull to adjust natural periods of heave, roll and pitch of the hull in relation to a prevailing dominant wave period to increase energy extraction by said wave energy extraction device.

12. A method as claimed in claims 9 and including the step of adjustably mooring said hull to vary the orientation of said hull relative to the direction of wave motion and/or the wind.

13. Apparatus for extracting energy from wind and wave motion, said apparatus comprising:

a common floating platform comprising a hull of a ship or vessel, said hull being subject to pitching and/or rolling motion from wind and/or waves;

means for mooring said hull in an offshore location;

one or more vertical axis wind turbines supported on said hull for extracting energy from wind; and one or more wave energy extraction devices positioned at least at one side of said hull for extracting energy from wave motion relative to said hull whereby in use pitching and/or rolling of said hull consequent upon wind gust loading on said wind turbines and/or wave motion increases relative movement between the or each said wind turbine and the surrounding air and between the or each said wave energy extraction device and the water adjacent said hull resulting in an increase in energy extraction from wind and wave motion;

wherein one or more of said wave energy extraction devices comprise one or more oscillating water column (OWC) wave energy conversion devices, each said OWC device having an upright air chamber open on its lower end and submerged in water and means for extracting energy from the compression and expansion of air within said chamber caused by an oscillating column of water in said chamber due to wave motion.

14. Apparatus as claimed in claim 13 wherein said hull includes one or more storage tanks for carrying water and means for adjusting the mass and distribution of the water in said tanks to adjust natural periods of heave, roll and pitch of said hull in relation to a prevailing dominant wave period to which the floating platform is subjected to maximise energy capture by said wave energy extraction device/s.

15. Apparatus as claimed in claim 13 and including adjustable guide means on the side/s of the hull for directing waves towards said OWC devices.

16. Apparatus as claimed in claim 13 wherein said chamber has an outer wall on a side of said hull adapted to be positioned to face the oncoming swells or wave motion, said wall being mounted for movement with horizontal wave and hull motion to increase the fluctuation in volume of air in the chamber, thereby increasing the energy extraction therefrom.

17. Apparatus as claimed in claim 16 wherein said wall is mounted to an upper end of said chamber for hinged movement about a substantially horizontal axis, said wall being provided with a float at its lower end.

18. Apparatus as claimed in claim 13 and including one or more water current energy extraction devices for extracting energy from water current movement relative to said hull, said one or more water current extraction devices being mounted to said hull and being adapted in an operative position to extend beneath said hull.

19. Apparatus as claimed in claim 18 wherein the or each said water current energy extraction devices comprises a cross flow water turbine having a substantially vertical shaft, said shaft being telescopic whereby said turbine may be retracted into said hull or extended to said operative position.

20. Apparatus as claimed in claim 19 wherein said turbine includes a plurality of blades, said blades in said operative position being positioned radially outwardly of said shaft and extending substantially parallel to said shaft, said blades being foldable into a substantially vertical plane adjacent to said shaft to enable retraction of said turbine into said hull.

21. Apparatus as claimed in claim 20 wherein one or more of said water turbines are mounted in said chambers of respective said OWC devices and are retractable into or extendable from said chambers.

\* \* \* \* \*